US008611187B2

(12) United States Patent
Bis et al.

(10) Patent No.: US 8,611,187 B2
(45) Date of Patent: Dec. 17, 2013

(54) MINER ACOUSTIC COMMUNICATION AND LOCATION SYSTEM

(75) Inventors: Frank J. Bis, Dublin, OH (US); Richard W. Givens, Columbus, OH (US); James J. Reuther, Worthington, OH (US); Walter G. VanCleave, Pickerington, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 13/316,719

(22) Filed: Dec. 12, 2011

(65) Prior Publication Data

US 2012/0082005 A1    Apr. 5, 2012

Related U.S. Application Data

(62) Division of application No. 12/377,212, filed as application No. PCT/US2007/017973 on Aug. 14, 2007, now Pat. No. 8,100,479.

(60) Provisional application No. 60/837,008, filed on Aug. 11, 2006.

(51) Int. Cl.
*G01S 15/00* (2006.01)
(52) U.S. Cl.
USPC .......................... 367/99; 367/81; 340/870.07
(58) Field of Classification Search
None
See application file for complete search history.

(56) References Cited

U.S. PATENT DOCUMENTS

| 3,439,508 | A | * | 4/1969 | Payne et al. ................. 405/296 |
| 4,099,785 | A | * | 7/1978 | Groetschel .................... 299/11 |
| 4,297,057 | A | * | 10/1981 | O'Neil .......................... 405/303 |
| 4,879,755 | A | * | 11/1989 | Stolarczyk et al. ............. 725/41 |
| 6,359,871 | B1 | * | 3/2002 | Chung et al. ................... 370/338 |
| 6,945,738 | B2 | * | 9/2005 | O'Quinn et al. .............. 405/302 |
| 8,374,055 | B2 | * | 2/2013 | Yang et al. ..................... 367/127 |
| 2003/0034155 | A1 | * | 2/2003 | Reagen et al. ................ 165/182 |
| 2003/0048104 | A1 | | 3/2003 | Stolarczyk |
| 2010/0135116 | A1 | * | 6/2010 | Bis et al. ........................ 367/81 |
| 2011/0140913 | A1 | * | 6/2011 | Montenero .............. 340/870.07 |
| 2011/0251968 | A1 | * | 10/2011 | Parker .......................... 705/317 |

OTHER PUBLICATIONS

Kononov, V. A.; Develop a Trapped Miner Location System and an Adequate Rescue Strategy and Associated Technologies; SIMRAC Final Project Report GEN 502; Nov. 1998; 36 pgs.
Harris, Randall J.; Draft Summary of First Workshop on Trapped Miner Location using Siesmic Listening Devices—Report to the Director of the Office of Miners' Health, Safety and Training; Jun. 28, 2006; 12 pgs.

(Continued)

*Primary Examiner* — Rexford Barnie
*Assistant Examiner* — Angela Brooks
(74) *Attorney, Agent, or Firm* — Yimei C. Hammond; Kremblas & Foster

(57) ABSTRACT

A miner communication and locating system is disclosed. Two technologies used in the system include a communicator, and a locator array that may be used with a computer. The communicator portion allows trapped miners to continually signal without physical effort that they have survived a cave-in or explosion in a direct, mechanical, and reliable manner. The locator array receives the communicator signal for use to accurately identify where the survivors are underground, and facilitate their rescue; a computer can be used to calculate the position of the communicator from information provided by a plurality of locators: global positioning system receivers may be used with the locator array.

7 Claims, 8 Drawing Sheets

(56) References Cited

OTHER PUBLICATIONS

Ge, Maochen; Comments on Underground Mine Rescue Equipment and Technology (RIN 1219-AB44); Feb. 27, 2006; 8 pgs.

Pittman, Walter E. Jr., et al.; Through-The-Earth Electromagnetic Trapped Miner Location Systems; U.S. Department of the Interior, Bureau of Mines, Open File Report: 127-85; 57 pgs.

Chirdon, David, et al.; Underground Communication and Tracking Systems Tests at CONSOL Energy Inc., McElroy Mine; Mine Safety and Health Administration, Technical Support, Report of Findings, Jun. 13, 2006; 28 pgs.

Durkin, John et al.; Evaluation of the Seismic System for Locating Trapped Miners; Bureau of Mines Report of Investigations/1981; No. RI 8567; 45 pgs.

\* cited by examiner

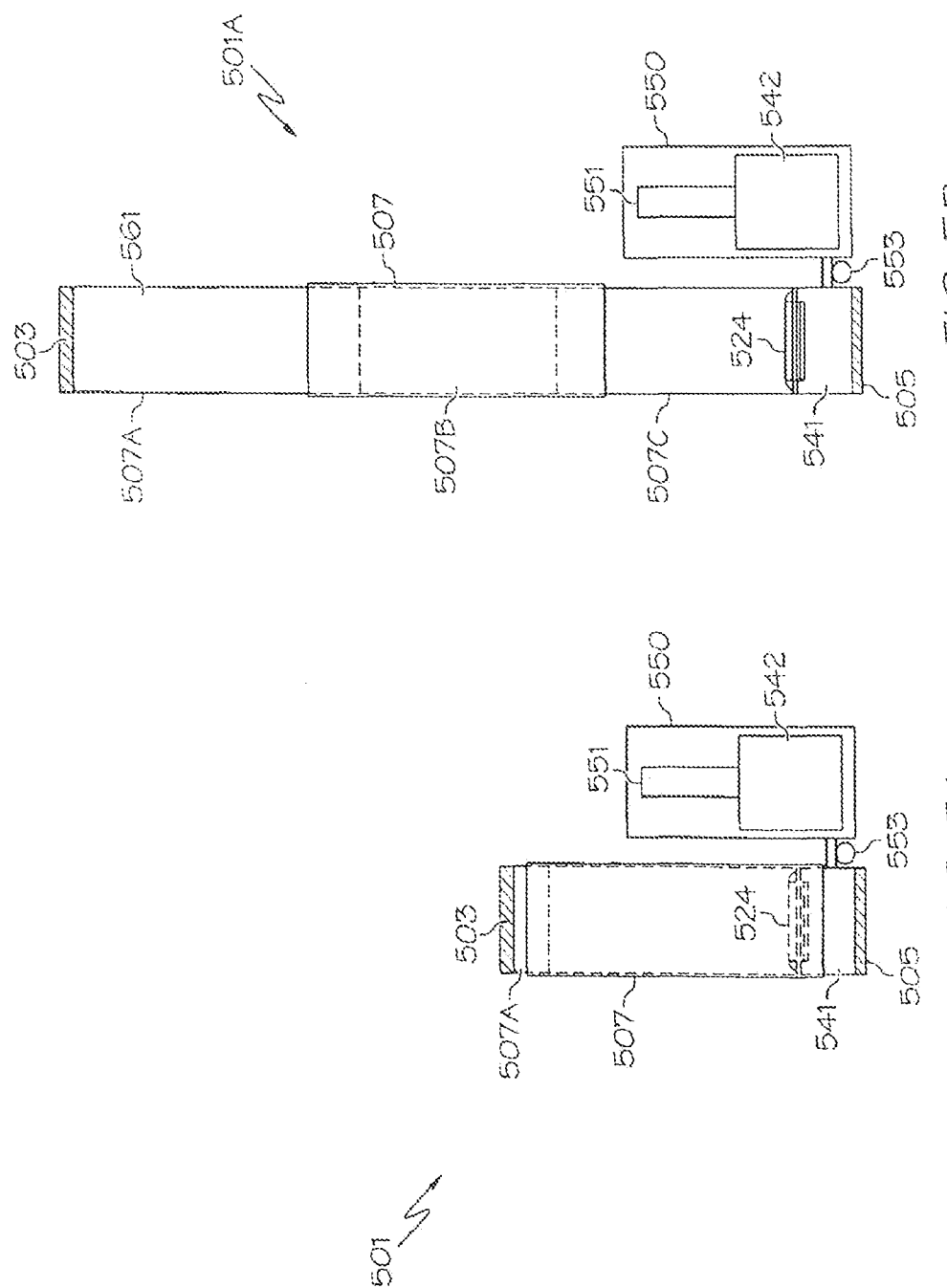

MINER ACOUSTIC COMMUNICATION AND LOCATION SYSTEM

This application is a divisional of a pending U.S. application Ser. No. 12/377,212 for MINER ACOUSTIC COMMUNICATION AND LOCATION SYSTEM, Frank J. Bis et al. inventors, which is a US national stage application of the International Application No. PCT/US07/17973 filed on Aug. 14, 2007, and by the way of the PCT application under 35 U.S.C. 371, claims the benefit of U.S. Provisional Application 60/837,008, filed on Aug. 11, 2006, for MINER COMMUNICATION AND LOCATION SYSTEM, Frank J. Bis et al inventors. Both U.S. Provisional Application 60/837,008 and U.S. application Ser. No. 12/377,212 are hereby incorporated by reference.

FIELD OF THE INVENTION

The invention includes a miner signaling and locating system. The disclosed system includes a communicator, and a locator array that includes a plurality of locators. The communicator allows trapped miners to continually signal without physical effort that they have survived a cave-in or an explosion in a direct, mechanical, and reliable manner. The locator array allows this signal to be used to identify where the survivors are underground, and begin their rescue.

BACKGROUND OF THE INVENTION

The tragic loss of over 250 lives in underground mine fires in West Virginia, Kentucky, Mexico, and China in late 2005 and the first half of 2006, has revealed a serious deficiency in terms of emergency response.

Typically when a mine accident occurs, there is a failure to locate and rescue underground miners surviving an explosive accident in time. Days, not hours have been necessary to get rescue teams to the scene, locate any survivors, develop a safe plan, and save the survivors. To mine survivors, awaiting rescue is a life-threatening ordeal, especially when they cannot communicate with the surface that they are alive and where they have taken refuge. After underground mine collapses from explosions, seismic activity or other causes, escape paths are probably blocked. Miners are trained to barricade themselves in a habitable atmosphere available while awaiting rescue. Once safe, survivors attempt to communicate with the surface about their location, number of persons, and status. Often, hardwired mine communication phones are knocked out, or are unreachable, because of the presence of deadly gases in the post-explosion atmosphere, or because of blocked passages by rock debris. When denied or separated from communication equipment, miners resort to desperate, archaic communication techniques, namely, pounding on steel structures (plates or rails) with hammers to attempt to send acoustic signals to rescuers within audible range above. However, all too often, mine rescue teams are not within this range because these signals are usually too weak to be detected on the surface.

Two-way wireless electronic communications systems are being considered as upgrades to existing hardwire mine communication phones. However, these advanced systems have similar problems associated with hard wired systems. They also need to be interconnected to the surface from the miner locations underground via mine passages, which are now blocked. More failsafe, alternative communications devices are urgently needed that communicate form the underground to the surface after the collapse of the mine passages.

BRIEF DESCRIPTION OF THE INVENTION

Broadly the invention includes a mine communicator made up of an sleeve (may be an extendible sleeve) having a top, a base and an inner volume; a piston within the inner volume; a gas inlet to the inner volume in the vicinity of the base and a gas outlet in the vicinity of the top; a gas expansion chamber in communication with the gas inlet to the inner volume; a gas supply unit in communication with the gas expansion chamber; and a control unit for controlling the generation of gas from the gas supply unit. Typically the communicator is deployed as depicted in FIGS. 4, 5A and 5B with only a sleeve between the roof, wall, floor or a roof bolt and the floor of the mine. In another embodiment the communicator is deployed as part of a larger unit that includes at least two or more extension cylinders (preferably four, see FIGS. 3, 6A and 6B) that typically engage a roof plate and a floor plate to provide additional support for the area where the miners are awaiting rescue. Another embodiment provides for a more compact and portable unit illustrated in FIG. 7.

A further broad embodiment of the invention provides for a communicator and a location array that includes the embodiments described above and further includes a plurality of locator devices for receiving signals from the communicator.

An additional broad embodiment of the invention includes a communicator and locator array according to embodiments disclosed immediately above and further includes a computer for processing signals or input information from the locators in the locator array for determining the location of the communicator in three dimensional space.

The communicator as disclosed herein offers the ability to identify the existence and location of survivors; the ability to survive cave-ins and explosions and operate in post-explosion conditions; operability in self-sufficient mode for long periods; and simplicity in operation and maintenance.

An additional embodiment provides for a mine communicator comprising a sleeve having a top, a base and an inner volume; a piston within the inner volume, wherein an acoustic signal is generated when the piston strikes the top the sleeve; a gas inlet to the inner volume of the sleeve in the vicinity of the sleeve base below the piston, and a gas outlet in the vicinity of the sleeve top; a gas supply in communication with the gas inlet; and a control unit for controlling the flow of gas from the gas supply to the gas inlet. Typically the mine communicator includes two or more extension cylinders and pistons for engaging a roof plate and a floor plate to provide additional support for the area where individuals are awaiting rescue. Another embodiment provides for a gas expansion chamber in the gas supply for storing generated pressurized gas.

A further embodiment provides for a mine communicator and location system comprising a communicator that generates acoustic signals in the roof, wall or floor of a mine; two or more locators each comprising a geophone for detecting an acoustic signal from the communicator and providing information from which location of the communicator can be calculated. Typically the communicator is gas operated. Preferably the mine communicator and location system uses a computer in communication with the locators for calculating the location of the communicator. When the communication is wireless a transmitter is typically connected to the geophone and a receiver connected to the computer for providing data to the computer for calculating communicator location. In some embodiments a global positioning unit is at each locator for providing the location of the locator.

Additional embodiments provide for a mine communication and location system comprising a communicator for providing acoustic signals for transmission through the ground; a locator for receiving acoustic signals from the communicator comprising a geophone, a GPS receiver, and a transmitter for transmitting geophone signals and GPS position; and a receiver and a computer for receiving the transmitted information calculating the position of the communicator from the received information.

A yet further embodiment provides for portable mine communicator comprising a sleeve having a top, a base and an inner volume; a piston within the inner volume; a gas inlet to the inner volume below the piston and a gas outlet in the vicinity of the top; a gas supply unit in communication with the gas inlet; and a control unit for controlling the generation of gas from the gas supply unit. Typically an attachment for system for attaching the portable mine communicator to a mine roof, wall or floor is used.

An additional embodiment provides for a method for locating miners in a mine comprising the steps of generating acoustic signals with a communicator, wherein the signals are transmitted into the roof, wall or floor of the mine; detecting the acoustic signals at the surface of the earth or below ground with a plurality of geophones that provide data as to the location of the communicator; and calculating the location of the communicator from the provided data.

BRIEF DESCRIPTION OF THE DRAWINGS

FIG. 5A is a schematic drawing of a stowed sleeve and a gas supply.

FIG. 5B is a schematic drawing of an extended sleeve and a gas supply.

DETAILED DESCRIPTION OF THE INVENTION AND BEST MODE

Broadly the present invention discloses a miner signaling and locating system. Broadly, the system typically includes in one embodiment a communicator and locators. The communicator allows trapped miners to continually signal, without physical effort, that they have survived a cave-in or explosion in a direct, mechanical, and reliable manner. A locator allows this signal to be used to identify where the survivors are underground. In a further embodiment the miner communication and location system includes a communicator, a plurality of locators, and a computer typically interconnected by wire or wireless communication know in the art. When no computer is connected to the system, computations will normally be done by hand or by hand input into a portable calculator or portable computer. It is important to note that the electronic communication portion of the present invention whether by wire or wireless is above ground and is thus not subject to the aforementioned in mine limitations of the known art. The electronic communication can be analog or digital as is also known in the art. If analog communication is used an analog/digital converter is contemplated prior to computer computations.

Figure 1:
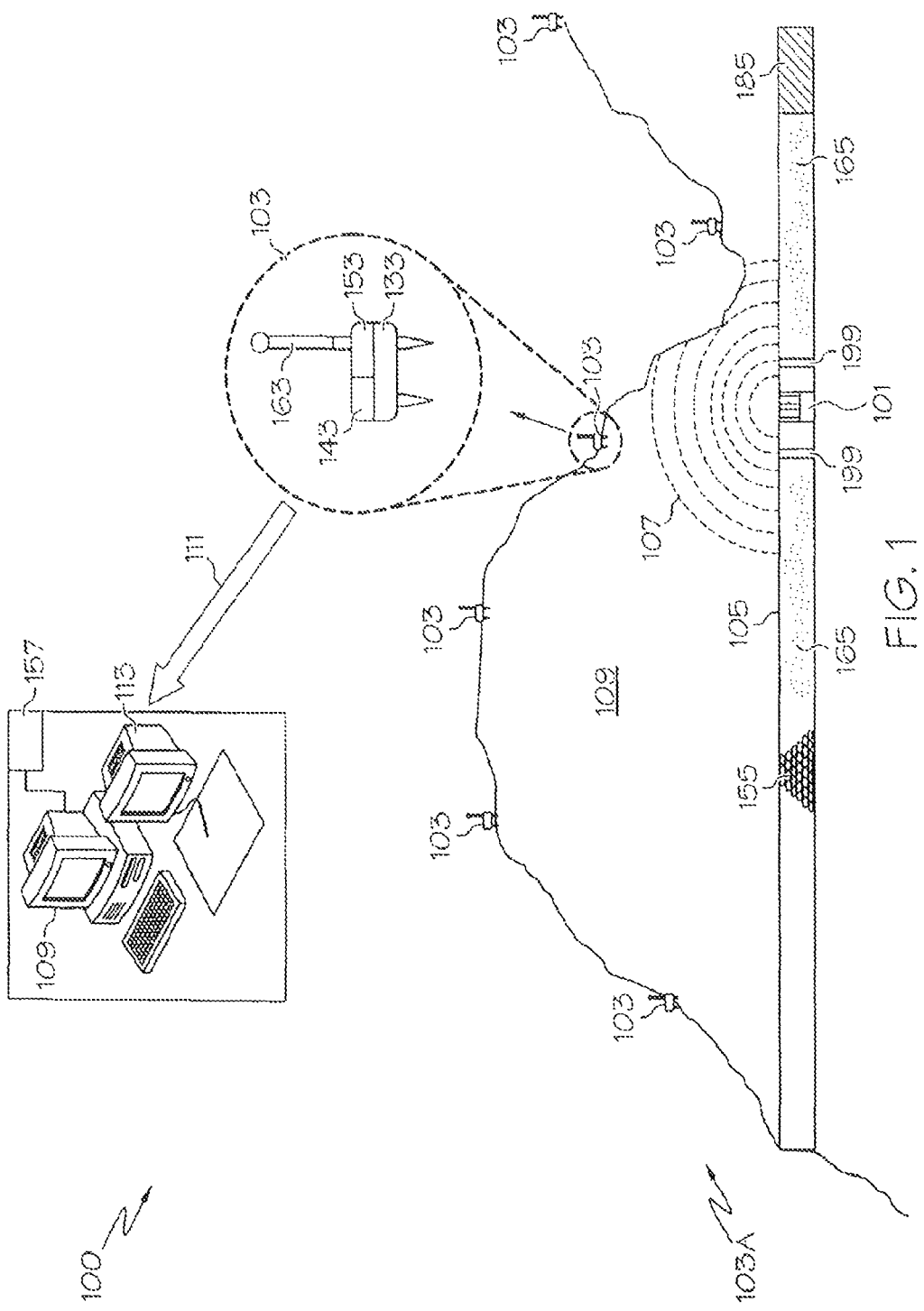
FIG. 1 is schematic drawing illustrating a typical system including location of a mine communicator, a plurality of locators, and a computer.

Referring now to FIG. 1, FIG. 1 is a generalized schematic that illustrates a miner communication and locator system 100 with typical locations for a communicator 101, locators 103 (e.g. geophones), and a computer 109. The communicator is typically located in a mine shaft 105 and produces an acoustic signal 107 that travels through the ground 109 to a locator 103 that is part of a locator array 103A that consists of a plurality of locators 103. The locators 103 are typically in communication with a computer either by wire connections or wirelessly 111. The computer 109 is typically used to interpret and calculate the location of a communicator 101 in three dimensional space by x, y, and z coordinates. The miners are typically trapped behind rubble 155 and/or noxious gases 165 between the entrance 175 and working face of the mine 185.

Specifically in one embodiment, the computer calculates coordinates of seismic pulse origins from a global positioning system (GPS) unit that typically includes synchronized clocks and GPS positions of the individual locators. The locator 103 and or computer 109 may include a display 113 visible to an operator that displays one or more maps of a mine, and depicts the calculated location of a transmitting communicator on the map. Typically the computer 109 will have been programmed and provided images in memory of the mine passage system and locations of some or all of the locators. However, one or more locators 103 may need to be moved or added to the locator array 103A during the rescue operations. In the case where one or more locators 103 are moved or added to the locator array 103A the GPS unit will be important to fast rescue efforts since it will allow rapid site location. A typical locator 103 comprises a body containing a geophone 133. In further embodiments a GPS unit 143 is used that typically includes a clock for synchronizing time for measuring the sonic signal by the locators, and transmitter 153 (if a wired version is not used) and an antennae 163 for the transmitter 153 for transmitting data to the computer 109 from the locator (geophone data and GPS unit 143 data). A receiver 157 connected to the computer receives the transmitted data from the locator 103. Each locator 103 typically is part of an array of locators 103A that consist of a plurality of locators placed at the earth's surface on top of or near the mine. Alternatively some or all of the locators may be positioned in another portion of the mine as the rescue efforts continue. The communicator 101 may be deployed inside mine survivability system 199 for protecting the miners from noxious gas and to provide a safe haven.

Figure 2:
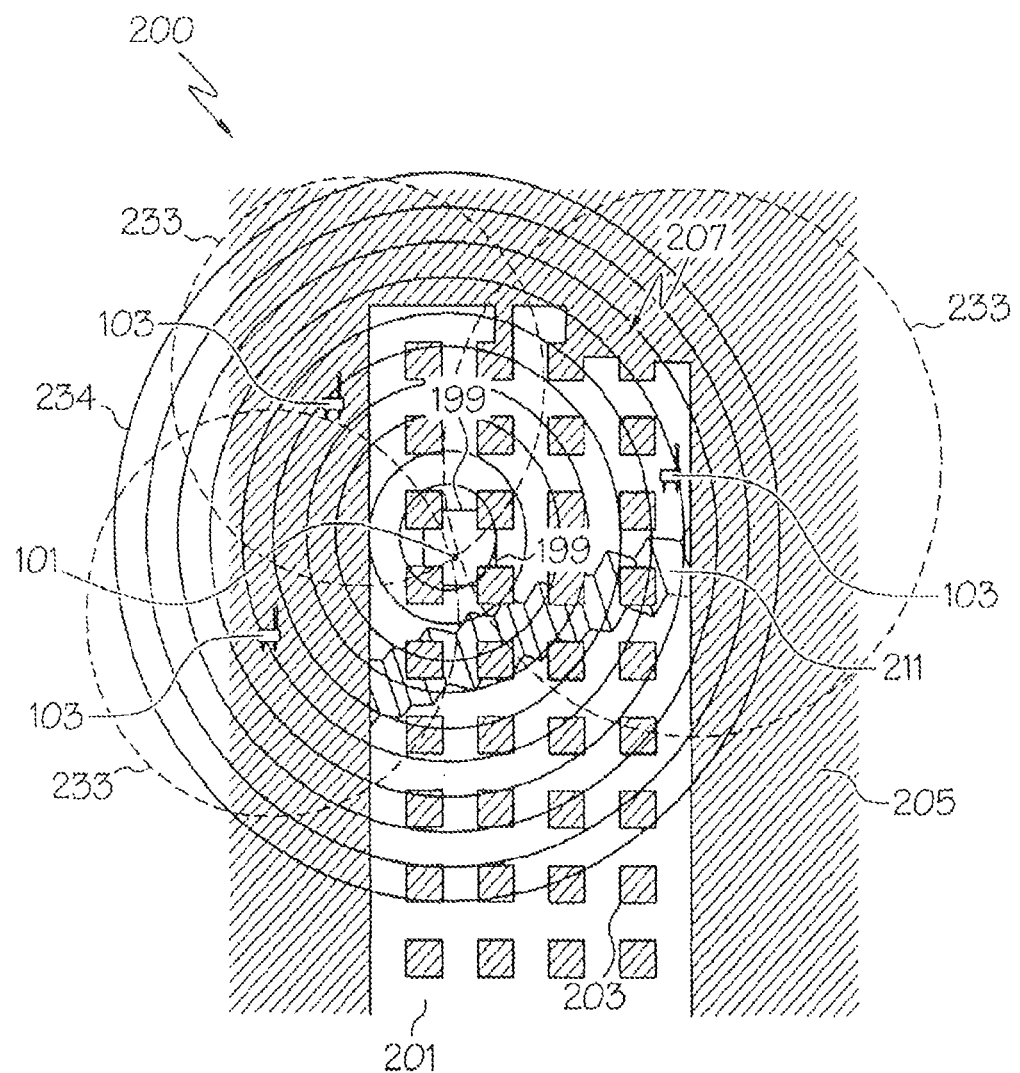
FIG. 2 is a schematic of a top view of the location of a typical mine communicator in a mine with pillars. Locators are superimposed on the schematic drawing.

FIG. 2 is a schematic of a top view of the location of a typical mine communicator 101 situated in a mine 200. Locators 103 located on the earth's surface are superimposed on the schematic drawing. FIG. 2 shows a typical mine 200 having passages 201, support pillars 203 unextracted ore, rock or coal 205 and a working face 207. After a mine accident rubble 211 may block a part of the mine passages so that the miners are trapped. In this drawing, location of the communicator 101 is by triangulation 233 of signals 234 sent to the locators 103 that allows the location of the communicator 101 and miners to be identified. The intersection of the three arcs identifies the location of the communicator 101. As the working face 207 of the mine 200 advances the communicator 101 can be moved so as to always be in the vicinity of workers at an active mine section as desired. Additional communicators 101 can be located at other locations where work is ongoing.

Figure 3:
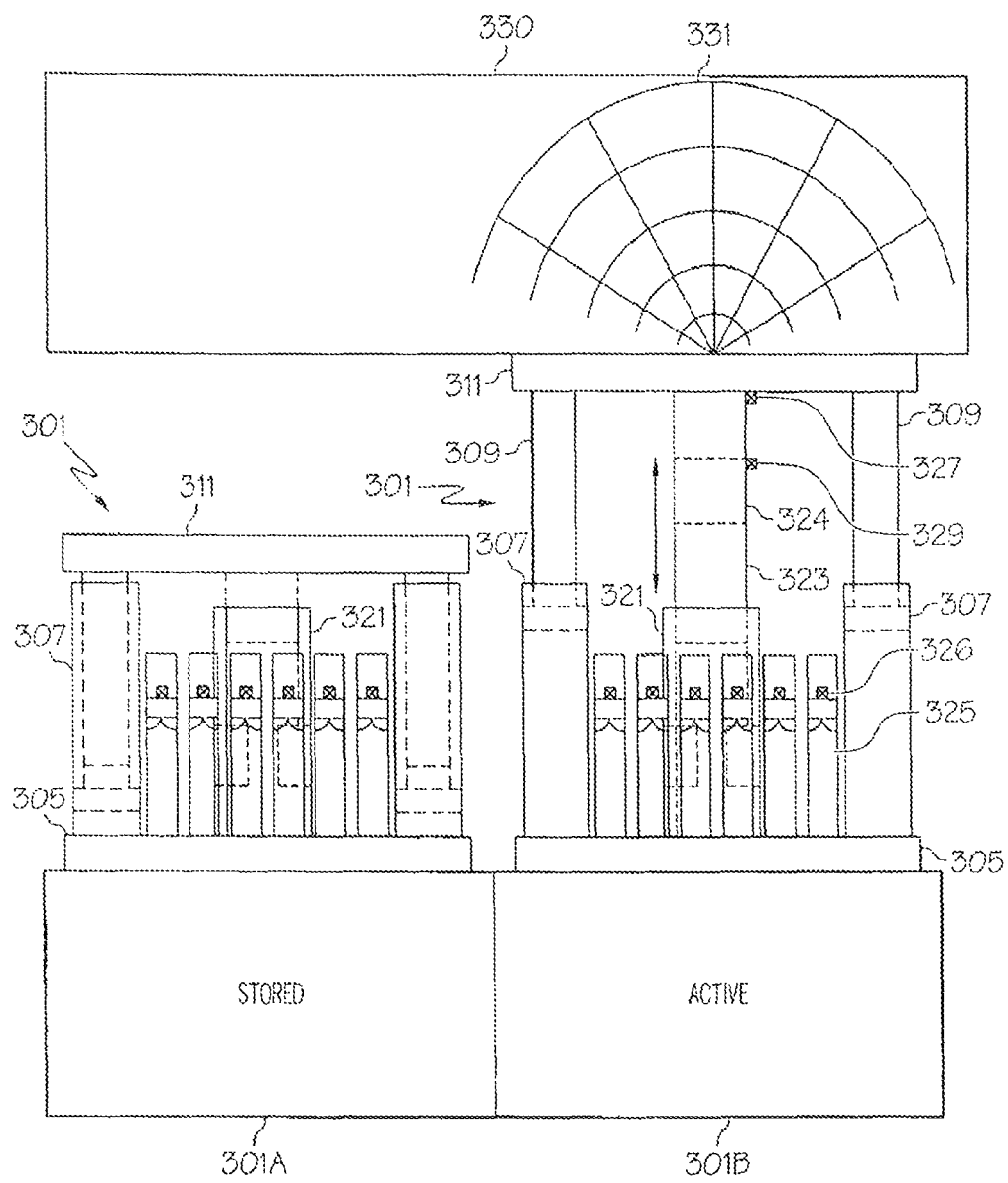
FIG. 3 is a schematic drawing illustrating a stored and active configuration for a mine communicator.

Referring now to FIG. 3, this figure is a schematic drawing illustrating a communicator 301 showing stored 301A and an active 301B configuration for a mine communicator 301. The extension cylinders 307 having extension piston 309, floor plate 305 and roof plate 311 provide additional support for the roof 330 where the survivors are awaiting rescue. Extension sleeve 309 stored within sleeve container 306.

The communicator is typically an energetic-material driven, piston-pulsing, acoustic wave-generator. Specifically, it may be a gas-powered mechanical device, not a battery-powered electronic communications device. The source of "power" is typically one or more solid propellant gas generators 326 (SPGG), that are typically similar to those used to inflate airbags in automobile passenger compartments upon impact. Each communicator 301 is typically equipped with the appropriate size and number of SPGGs 326 to supply pressure first to activate and then continually operate the device over a period of several days. The pressurized gas in this and other embodiments is typically under high pressure so that sufficient power can be brought to bear on the piston for an extended period of time. Multiple serial generation of pressurized gas is contemplated. Typically about a two day to about a twenty day gas supply is provided for each unit.

The activation step pressurizes hydraulic fluid (typically a non-flammable fluid such as water or water/glycol mixtures) in an array of small secondary cylinders 325. SPGGs in each small cylinder pressurize a larger chamber that forces a piston to move hydraulic fluid out of the bottom section. This fluid is pumped into larger primary extension cylinders positioned around the exterior of a plate 305. These primary cylinders provide force multiplication from the group of smaller cylinders, and are responsible for elevating a roof plate 311 from its stowed position up to contact the mine roof 330. At the same time, an extending sleeve 323 connected to the both the bottom 205 and top plates 311 is pumped into position. The sleeve 323 contains the mechanism for a reciprocating piston 324 that can generate specifically timed and tuned sonic pulses 331. Once in position, a sonic pulse 331 is transmitted to wall, floor or roof strata (roof strata is preferred) via the piston 324 and roof 311. Continued signaling is accomplished using a built-in pressure-modulating mechanism not shown in this view but see later figures. The repletion rate and characteristic of the sonic pulse 331 is tuned to transmit unique low-frequency, ground-penetrating sonic pulses 331 into the geologic strata of the mine roof. This signal is designed to be long ranging and is typically of equal or greater magnitude and duration than could be driven by human power. Typically the signal can be provided continuously or at selected intervals even when the trapped miners are asleep or later incapacitated. Attachment point 327 may be used for stability. Vent 329 allows venting of the gas so that the piston 324 can return to its original position.

Once in a safe location or a safe haven, surviving miners activate the communicator 301 by positioning the communicator 301 and turning it on (e.g. by flipping a switch, pulling a pin, etc.). Activation of this device provides direct unambiguous evidence to rescuers above that one or more miners are trapped below, and are alive for the time being.

Figure 4:
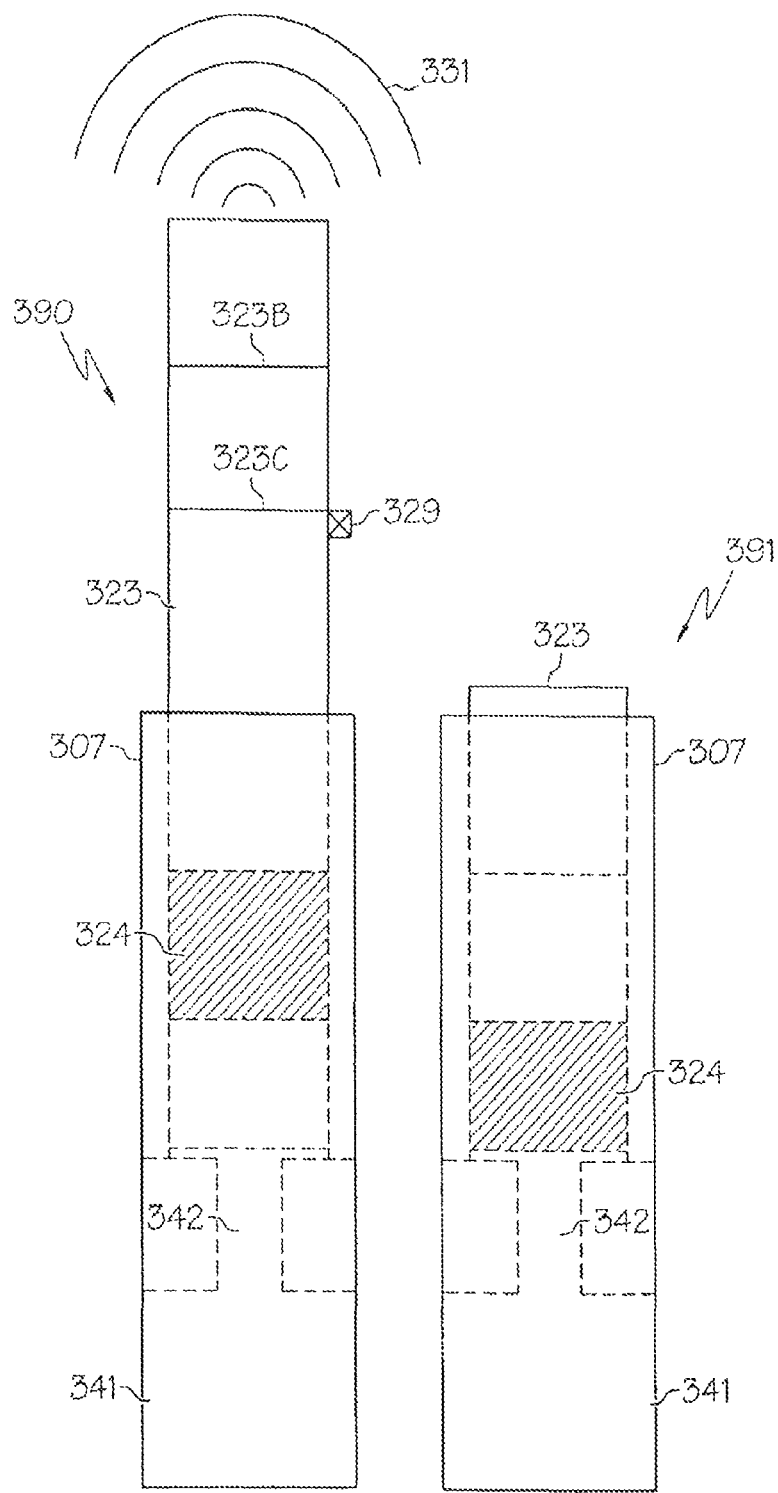
FIG. 4 is a schematic drawing of further details of the sleeve or extendable portion of a typical mine communicator that shows the sleeve in both the stowed and in the extended position with an upward moving piston.

Referring now to FIG. 4, FIG. 4 is a schematic drawing of further details of the sleeve or extendable portion of a typical mine communicator that shows the sleeve in both the stowed and in the extended position with an upward moving piston.

FIG. 4 shows a blown up version of a typical extension sleeve compartment 307 and extendable sleeve 323. Piston 324 slides up and down inside the sleeve 323. Sections 323B and 323C are shown for the extendable sleeve 323. The extended sleeve 390 is shown on the left and the unextended sleeve 391 is shown on the right. Gas expands in the expansion chamber 341 and flows through gas passage 342 to power the piston 324.

Referring to FIGS. 5A and 5B, FIG. 5A illustrates a stowed unextended sleeve 501 and an extended sleeve 501A with gas supply that does not require a sleeve storage cylinder. In this embodiment the communicator may include only the sleeve 507, piston 524, gas expansion chamber 541 and/or 542 and a gas supply unit 550 with appropriate control in the gas units 551. This embodiment allows for smaller sized and easier portability of the unit. The sleeve has an integral top plate 503 that engages a mine roof and a bottom plate or base plate that engages a mine floor. A piston 524 slides up and down inside the sleeve 507. The sleeve 507 consists of three sections 507A, 507B, 507c that slide in a sealed fashion to provide an extendable sleeve 507. Gas is generated in generator 550 in gas units 551 Pulsation is achieved in a reciprocating piston 524 that allows pressure to build up and discharge in gas expansion chambers 541 or 542 via specialized burst/check valves 553, or by single-shot discharges. A vent 561 allows gas to escape when the piston reaches the top plate 503.

Figure 6A:
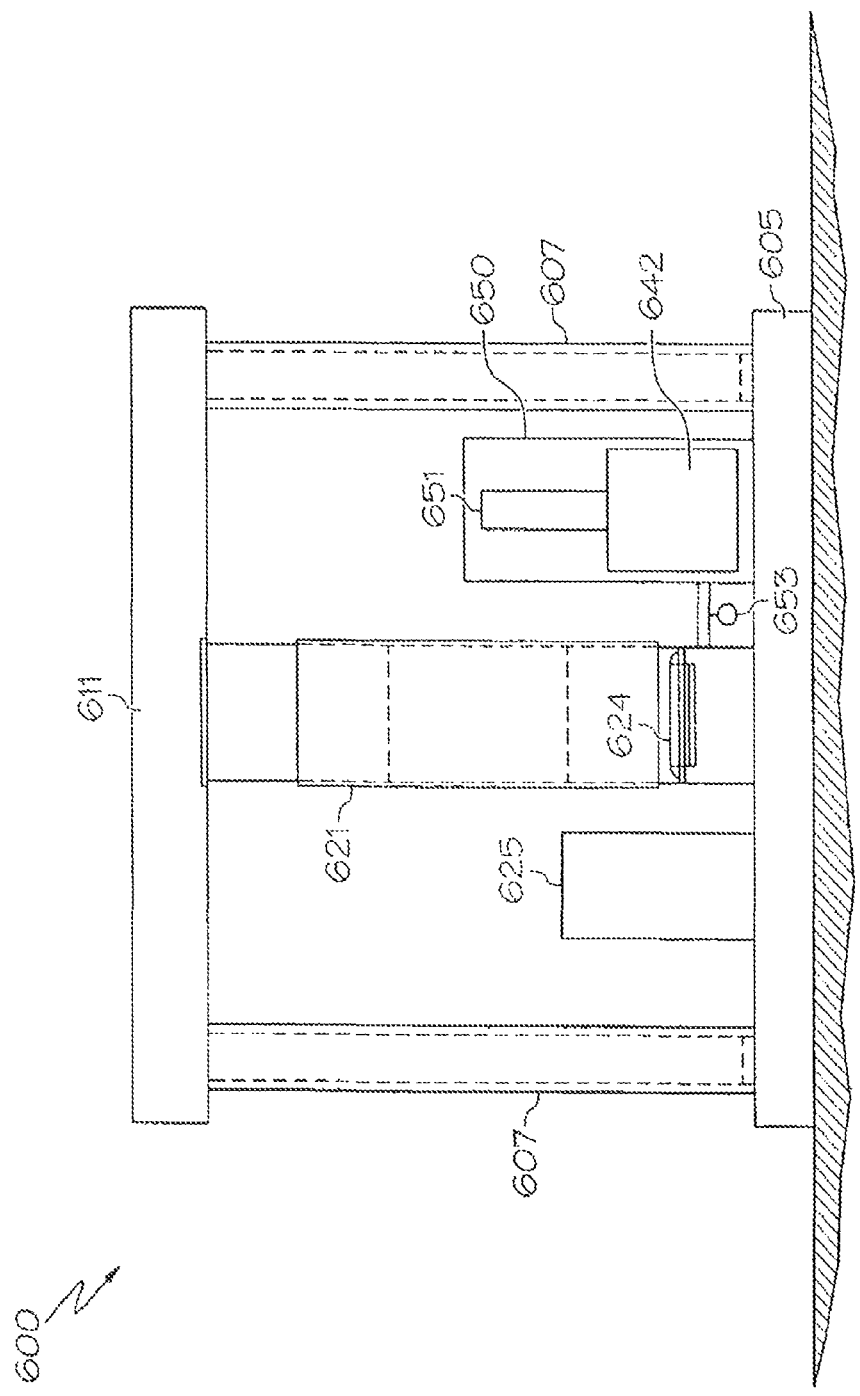
FIG. 6A is a schematic drawing of another embodiment of a stowed mine communicator.
Figure 6B:
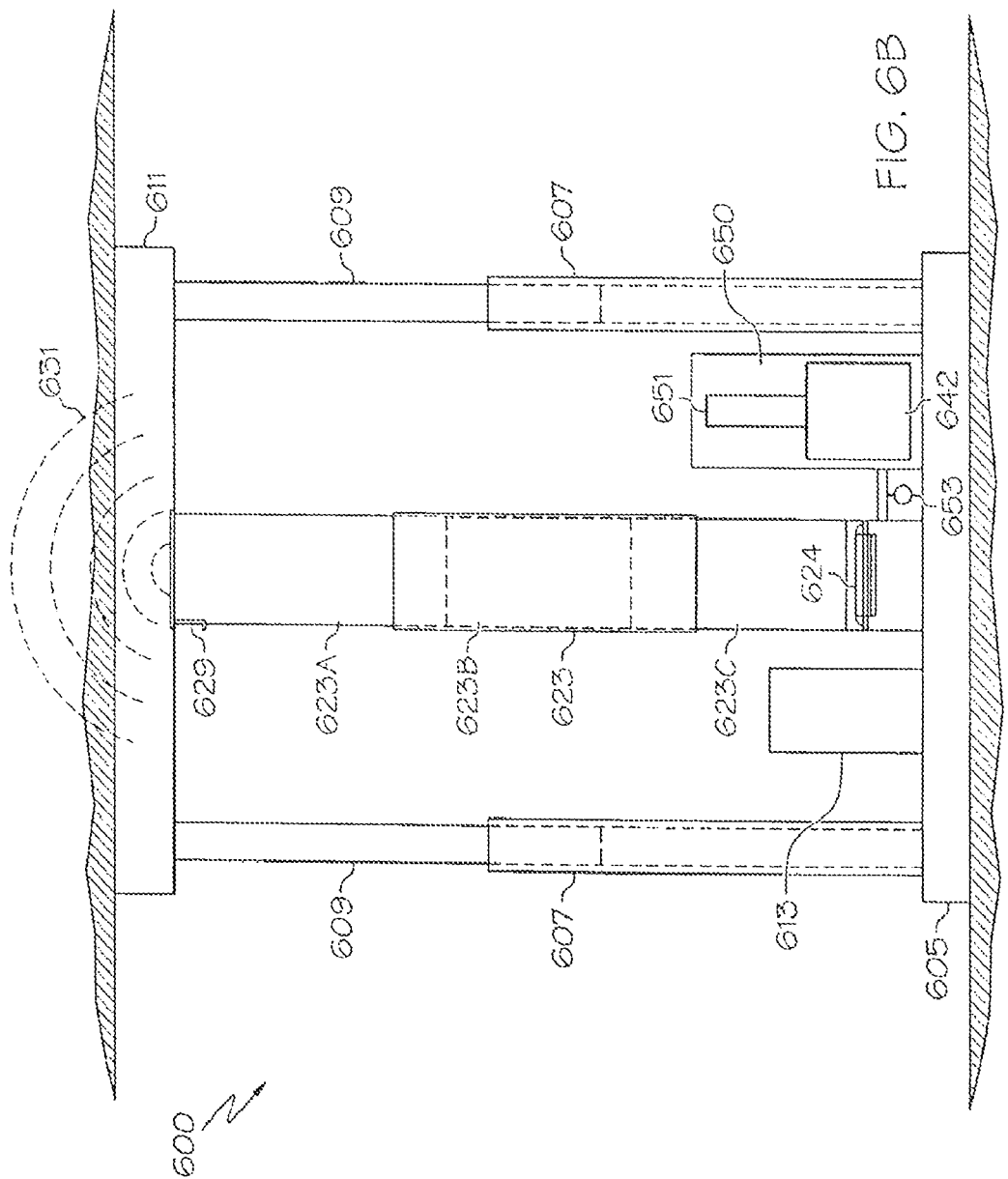
FIG. 6B is a schematic drawing of another embodiment of extended and active mine communicator.

Referring now to FIGS. 6A and 6B, these figures show stowed and active configurations of a communicator 600 respectively. The communicator 600 comprises a floor plate 605 and a roof plate 611, between which are mounted extension cylinders 607 having piston 609. Pistons 609 extend the roof plate 611 in response to hydraulic pressure generated in hydraulic generator 613 and provide additional support for the roof. The sleeve 623 is extended in response to pressure generated in gas generator 650. Gas is generated in generator 651 and flows to an expansion chamber 642 where it then flows to the sleeve 623. Portions of the extendable sleeve 623 are shown as 623A, 623B and 623C. The source of power can be the same as that discussed in FIG. 3A. Gas flow is controlled by a gas modulating system that is part of the gas generator 650 and can include a burst/check valve 653, or by single shot discharges in gas supply 651. A vent 629 allows gas to escape when piston 624 reaches the top plate 611. Signal 631 is generated by the piston when it strikes the top plate 611.

Given possible synergy between their basic operating principles, the communicator could be integrated into a Mine Barrier Survival System 199, (PCT application PCT/US2007/012643, filed May 29, 2007 and having the same assignee as the present application, incorporated herein by reference), and the combination used as a system to both shelter and locate trapped underground miners, see FIG. 1. Specifically, by using SPGGs that produce oxygen, excess discharge from a pulse could be used to supply some of the oxygen demand in the safe haven established by The Mine Curtain Survival System. Finally, as another complementary attribute, when in position, the communicator would stabilize the immediate roof in the safe haven in a manner similar to a temporary roof support.

A more detailed messaging capability can also be integrated into the communicator. In another embodiment, options that allow a change in the pulse timing that can be selected by the trapped miners to correspond to the number of survivors, the urgency of their situation, and their status or other preselected information. Most important, however, is the fact that a communicator signaling the surface communicates that at least one miner has survived and that a maximum effort should be brought to bear to his/her rescue at the location of the signal. How this location is determined is described next.

Figure 7:
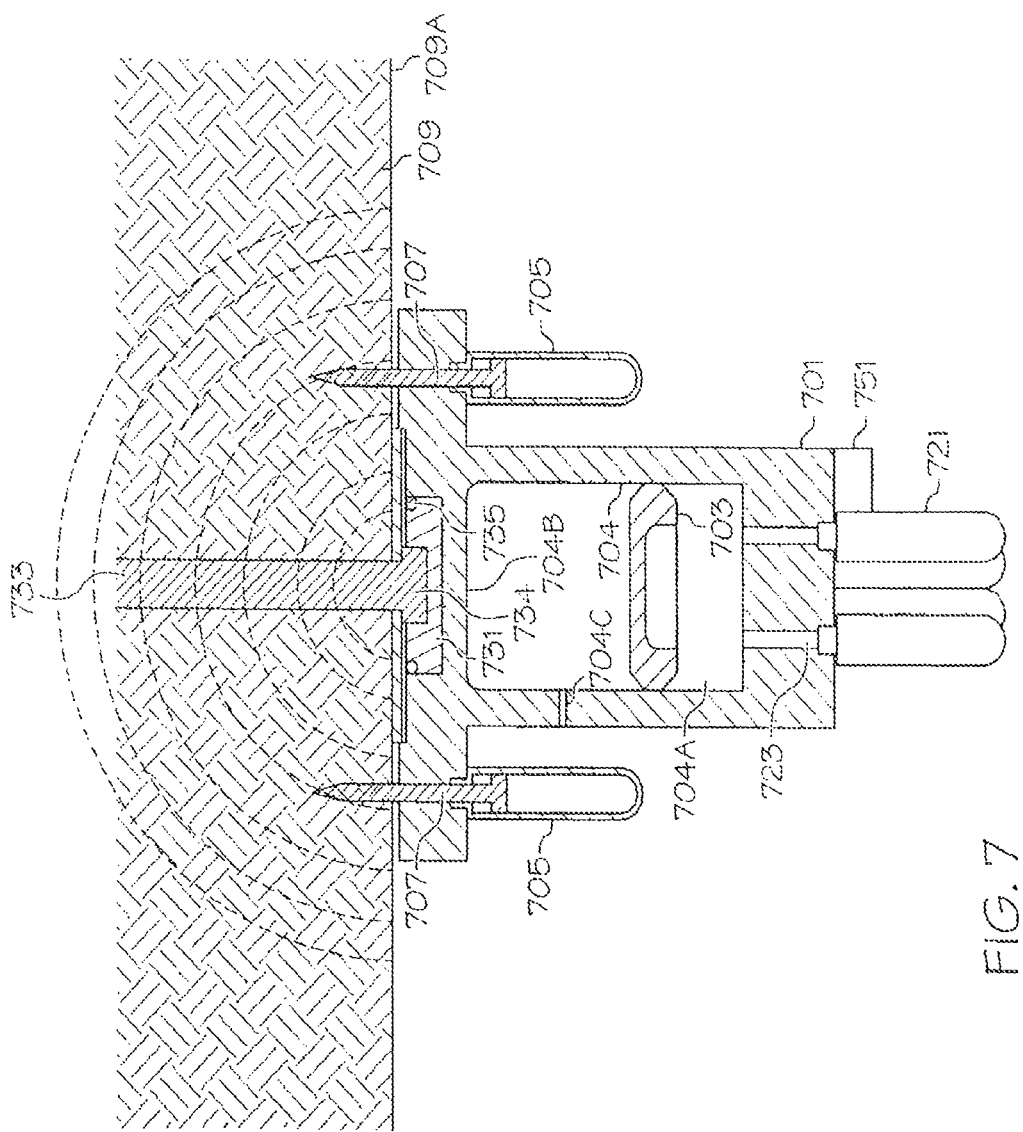
FIG. 7 is a schematic drawing of a portable communicator that can be attached to a mine roof, wall or floor.

FIG. 7 is a schematic drawing of a portable communicator 700 that can be attached to a mine roof. The portable communicator 734 consists of a body 701 that encloses a piston 703 in a gas chamber 704. The piston moves up in response to gases generated in gas generators 721 that flow via gas line 723 to the lower part of the gas chamber 704A. When the piston hits the top of the gas chamber 704B a signal 750 is generated that is transmitted to locators 103 (not shown in this drawing). Gas is vented from vent 704C as the piston is at or near its upper limit. The repetition rate or frequency of the signal generation can be set as desired. Typically the signal pulses repeat every 1-10 seconds to every several hours. For achieving extended signaling periods (for example if it becomes apparent to the trapped miners that they will be trapped for an extended period i.e. two weeks) a miner could reduce the repetition rate to one per hour or longer to several hours by adjusting control unit 751 that controls the gas generation rate.

In one embodiment, the portable communicator 700 can be attached to a mine wall such as a side wall or the roof 709A with an explosive bolt mechanism 705 that drives a bolt 707 into the coal or rock 709 of the wall or roof 709A A roof bolt attachment unit 731 can be a collapsing collet that is utilized to attach the portable communicator 734 to the roof bolt 733. The collet is placed over the head of the bolt 734 and a tapered ring 735 is forced over the collet producing a large clamping force to support the weight and operation of the communicator. Alternatively the attachment unit 731 is a mechanism similar to a bolt extractor. The mechanism is aligned with the head of the roof bolt 734 and torque is applied to allow spiral flutes to engage and lock onto the surfaces of the bolt head 731. The portable communicator 700 is then able to be suspended from the roof bolt 734 during its operation.

Various embodiments of the inventive system typically have the one or more of the following attributes: There are typically one or more communicators 101 in a mine. When more than one communicator is present the frequency of a generated signal 107 can differ between different communicators 101 so that each can be identified as to location as described further below. The system 100 is functional even after collapse of nearby mine passages since the signal 107 propagates (directly through the earth and rock. The parts are typically operational even in harsh post-explosion or cave in conditions (environmentally robust) and are intrinsically safe such that the system 100 can be used even in flammable atmospheres. The underground portion of the system is typically instant-on, self-powering and self-operating (no batteries required). The system 107 is typically operational over the entire emergency (several days, not hours). Importantly, the system generates distinct, clearly identifiable acoustic signals to rescuers.

The Locator and Locator Array

Referring again to FIG. 1, a locator array 103A is typically comprised of a plurality of locators 103 each comprising at least a geophone 143 designed and deployed to detect the unique sonic pulses generated by the communicator 101. Ideally, these locators 103 are pre-positioned at surface locations corresponding to above or near normally active sections of the operating mine. Such pre-positioning would greatly reduce the time required to detect signals from the communicator, as well as the time to affect rescue. Prepositioning also allows location information to be put into computer memory so that if the locators are not moved a GPS system may not be needed. However, post-event deployment is also viable in which case a GPS system is preferred and can still be used even in the prepositioned embodiment.

A typical locator 103 will provide direction of the pulse and the distance to the pulse origin. Accurate synchronized time clocks provided in the geophone or by separate time clocks in the locator or in a GPS unit are typically also needed to accurately locate the communicator 101. Rescuers would use these locators 103 to detect the unique signals generated by the communicator 101, and then use algorithms calculated by hand or by computer to triangulate the underground location from where the survivors are signaling. Typically in one embodiment of the invention, three or more locators are used to accurately identify the location of the communicator in x, y, and z coordinates. In a special case where the surface above the mine is generally flat and the locators are located in a plane on the surface only two locators are needed to locate the communicator in a mine.

The locators 103 deployed could be connected to a power grid, be battery powered, or use the power grid or solar panels to trickle charge the batteries for very long-duration deployment. The electronics incorporated into these units typically contains circuitry for accepting information from a global positioning system (GPS). GPS data would specify positions for each locator and synchronize their clocks. Exact data on surface location and time are necessary to accurately triangulate the origin of sonic pulses from the communicator.

The array of locators 103A are typically linked between each of the locators and/or each is linked to a centralized computer located at a fixed or portable mine-rescue command center. Wireless linkage and communication of data is preferred (but not required) as it would allow the rapid relaying of data on survivor position(s) to staged or deployed mine-rescue teams.

The high fidelity geophone 143 in a locator 103 can be used in advance to determine the dominate ground frequency resulting from a single pulse source, and, thereby, maximize the transmitted signals. Mathematical algorithms would identify this frequency, and the communicator can be tuned to approximately or substantially match it. This would allow maximization or optimization of the sonic signal at the various mine locations, with their varying geology, even in the presence of noises from seismic disturbances. Tests performed in advance will allow compensation for ground anomalies or particular mine characteristics to be placed in computer memory for aiding location of the communicator 101.

Fixing the position of survivors would offer multiple and more immediate means for miner survival and rescue. Quickly determining survivor coordinates makes possible direct-rescue drilling to the location of their temporary safe haven. As a recent event at a mine in Utah has shown, the ability to drill into a mine where the miners are suspected to be does not necessarily provide immediate location of the miners. Being able to drill to the known location of the miners at a communicator allows the assured delivery of communications, air, food, and water lines for enhanced survivability and comfort. Alternatively, the decision could be made to await the arrival of a mine rescue team, or perform larger drilling to drop down a specialized man basket (effectively used to rescue nine men in the Quecreek, Pa., mine disaster).

The new technology differentiates itself from other communications technologies because the underground portion is non-electronic; non-network based; non-battery powered; and can be configured to satisfy requirements selected from the following list:

Consists of a single-component, self-contained, stand-alone component;

Transmits to surface even after there are surrounding mine collapses;

Operates anywhere underground even if totally isolated by cave-ins;

Broadcasts directly to surface and reveals survivor location;

Continues broadcasting non-stop for many days typically two to 20 days, preferably at least 7 days;

Stores compactly with little maintenance and is easily set up; and

Stores with several year's of shelf life.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

The invention claimed is:

1. A mine communicator and location system comprising:
    A. a gas operated communicator that generates acoustic signals in the roof, wall or floor of a mine;
    B. two or more locators each comprising a geophone for detecting an acoustic signal from the communicator and providing information from which location of the communicator can be calculated.

2. The mine communicator and location system according to claim 1, further comprising:
    C. a computer in communication with the locators for calculating the location of the communicator.

3. The mine communication and location system according to claim 2, wherein the communication is wireless.

4. The mine communicator and location system according to claim 3, further comprising:
    D. a transmitter connected to the geophone and receiver connected to the computer for providing data to the computer for calculating communicator location.

5. The mine communicator and location system according to claim 1, further comprising:
    C. a global positioning unit at each locator for providing the location of the locator.

6. A mine communicator and location system comprising:
    a. a communicator for providing acoustic signals for transmission through the ground;
    b. a locator for receiving acoustic signals from the communicator comprising a geophone, a GPS receiver, and a transmitter for transmitting geophone signals and GPS position; and
    c. a receiver and a computer for receiving the transmitted information calculating the position of the communicator from the received information.

7. A method for locating miners in a mine comprising:
    a. generating acoustic sonic signals with a gas operated communicator, wherein the signals are transmitted into the roof, wall or floor of the mine;
    b. detecting the acoustic signals at the surface of the earth or below ground with a plurality of geophones that provide data as to the location of the communicator; and
    calculating the location of the communicator from the provided data.

* * * * *